United States Patent
Roberts et al.

(10) Patent No.: US 12,454,441 B2
(45) Date of Patent: Oct. 28, 2025

(54) ELEVATOR CAR MOVER CONFIGURED WITH AUXILIARY VEHICLE SUPPORT FOR FORCE RELEASE CONTROL

(71) Applicant: Otis Elevator Company, Farmington, CT (US)

(72) Inventors: Randy Roberts, Hebron, CT (US); Brad Guilani, Woodstock Valley, CT (US); Kiron Bhaskar, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1363 days.

(21) Appl. No.: 17/112,579

(22) Filed: Dec. 4, 2020

(65) Prior Publication Data
US 2022/0177271 A1    Jun. 9, 2022

(51) Int. Cl.
*B66B 5/20* (2006.01)
*B66B 1/32* (2006.01)
(Continued)

(52) U.S. Cl.
CPC .............. *B66B 5/20* (2013.01); *B66B 1/32* (2013.01); *B66B 5/18* (2013.01); *B66B 9/02* (2013.01);
(Continued)

(58) Field of Classification Search
CPC .... B66B 5/18; B66B 5/20; B66B 5/22; B66B 5/28; B66B 1/32; B66B 1/36;
(Continued)

(56) References Cited

U.S. PATENT DOCUMENTS

| 5,566,784 A | 10/1996 | Rennetaud |
| 2007/0051563 A1 | 3/2007 | Oh et al. |

(Continued)

FOREIGN PATENT DOCUMENTS

| CN | 201240749 Y | 5/2009 |
| CN | 105819321 A | 8/2016 |

(Continued)

OTHER PUBLICATIONS

European Search Report; Issued: Apr. 20, 2022; Application No. 21208569.0; Filed: Nov. 16, 2021; 7 pages.
(Continued)

*Primary Examiner* — Loren C Edwards
(74) *Attorney, Agent, or Firm* — CANTOR COLBURN LLP

(57) ABSTRACT

Disclosed is an elevator system, having: a car mover for moving an elevator car along a drive track in a hoistway, the car mover having: motor controlled wheels, wherein the car mover is configured to control the motor controlled wheels to move along the drive track; and a parking brake, operationally connected to the car mover and/or elevator car and operationally separate from the motor controlled wheels, wherein the car mover is configured to control the parking brake to move between a deployed state and a retracted state, wherein in the deployed state, the parking brake engages the drive track at a location that is spaced apart from the motor controlled wheels to park the car mover and/or elevator car along the hoistway, and in the retracted state, the parking brake is spaced apart from the drive track.

3 Claims, 15 Drawing Sheets

(51) Int. Cl.
    *B66B 5/18*     (2006.01)
    *B66B 9/02*     (2006.01)
    *B66B 11/04*     (2006.01)
    *F16D 63/00*     (2006.01)
    *B66B 17/34*     (2006.01)
    *F16D 121/20*     (2012.01)

(52) U.S. Cl.
    CPC .......... B66B 11/043 (2013.01); F16D 63/002 (2013.01); F16D 63/008 (2013.01); *B66B 17/34* (2013.01); *F16D 2121/20* (2013.01)

(58) Field of Classification Search
    CPC ......... B66B 1/365; B66B 9/02; B66B 11/043; B66D 5/32; B66D 5/34; F16D 63/002; F16D 63/008
    See application file for complete search history.

(56) References Cited

U.S. PATENT DOCUMENTS

2017/0225924 A1*   8/2017   Lau ........................... B66B 5/04
2019/0077637 A1     3/2019   Bhaskar

FOREIGN PATENT DOCUMENTS

| | | |
|---|---|---|
| CN | 108529410 A | 9/2018 |
| CN | 109466995 A | 3/2019 |
| EP | 3453664 A1 | 3/2019 |
| WO | 2005044709 A1 | 5/2005 |

OTHER PUBLICATIONS

Chinese Office issued in Chinese Application No. 202110947982.5 dated Mar. 27, 2024.

* cited by examiner

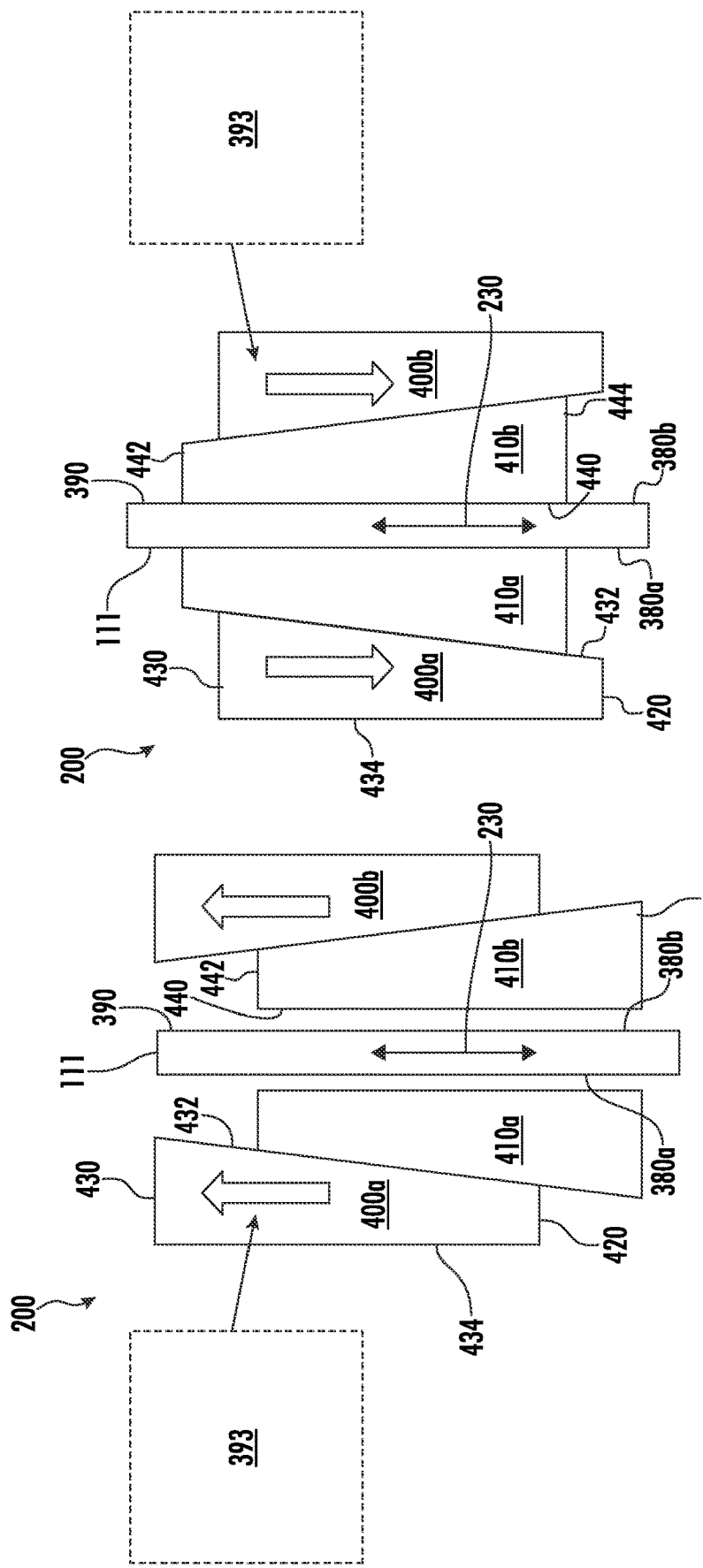

ELEVATOR CAR MOVER CONFIGURED WITH AUXILIARY VEHICLE SUPPORT FOR FORCE RELEASE CONTROL

BACKGROUND

Embodiments described herein relate to a multi-car elevator system and more specifically to an elevator car mover configured with auxiliary vehicle support for force release control.

An elevator car mover may use motor-driven wheels to propel the elevator car up and down on vertical track beams, which may be I-beams, having respective webs that form front and back track surfaces. Two elements to this system include the elevator car which will be guided by roller guides on traditional T-rails, and the car mover which will house two (2) to four (4) motor-driven wheels.

BRIEF SUMMARY

Disclosed is an elevator system, including: a car mover for moving an elevator car along a drive track in a hoistway, the car mover including: motor controlled wheels, wherein the car mover is configured to control the motor controlled wheels to move along the drive track; and a parking brake, operationally connected to the car mover and/or elevator car and operationally separate from the motor controlled wheels, wherein the car mover is configured to control the parking brake to move between a deployed state and a retracted state, wherein in the deployed state, the parking brake engages the drive track at a location that is spaced apart from the motor controlled wheels to park the car mover and/or elevator car along the hoistway, and in the retracted state, the parking brake is spaced apart from the drive track.

In addition to one or more features of the system, or as an alternate, the parking brake includes a swing arm that is configured to pivot between the retracted stated and the deployed state, wherein in the deployed state, the swing arm engages an aperture in the drive track to park the car mover and/or elevator car along the hoistway; and the swing arm is configured to pivot about an axis that is parallel or perpendicular to a long axis of the drive track.

In addition to one or more features of the system, or as an alternate, the parking brake includes an arcuate plate member, configured to pivot so that an outer surface of the arcuate plate member engages opposing flanges of a beam that defines the drive track.

In addition to one or more features of the system, or as an alternate, the arcuate plate member is formed as an ellipse.

In addition to one or more features of the system, or as an alternate, the arcuate plate member is operationally connected to the car mover and/or elevator car via a rotational shaft.

In addition to one or more features of the system, or as an alternate, the parking brake includes arcuate plate members that are configured to pivot so that an outer surface of each of the arcuate plate members respectively engages ones of opposing flanges of a beam that defines the drive track.

In addition to one or more features of the system, or as an alternate, the arcuate plate members are teardrop shaped.

In addition to one or more features of the system, or as an alternate, the arcuate plate members are operationally connected to the car mover and/or elevator car via respective rotational shafts.

In addition to one or more features of the system, or as an alternate, the parking brake includes a plunger that is configured to linearly transition between the deployed state and the retracted state, wherein in the deployed state the plunger engages an aperture in the drive track to park the car mover and/or elevator car along the hoistway.

In addition to one or more features of the system, or as an alternate, the parking brake includes a plunger that is configured to linearly transition between the deployed state and the retracted state, wherein in the deployed state the plunger engages a groove in the drive track to park the car mover and/or elevator car along the hoistway, wherein a drive track engaging end of the plunger is conically shaped or wedge shaped and the groove in the drive track defines a complementary shape to the drive track engaging end of the plunger.

In addition to one or more features of the system, or as an alternate, the parking brake includes a magnet, which is one of a permanent magnet and an electromagnet, configured to translate linearly to engage the drive track to park the car mover and/or elevator car along the hoistway.

In addition to one or more features of the system, or as an alternate, the magnet is the permanent magnet and the parking brake includes a solenoid operationally connected to the permanent magnet to translate the permanent magnet linearly to engage the drive track to park the car mover and/or elevator car along the hoistway.

In addition to one or more features of the system, or as an alternate, the magnet and the drive track engage each other via a friction surface formed on one or both of the permanent magnet and the drive track.

In addition to one or more features of the system, or as an alternate, the parking brake includes a scissor brake that defines jaw members, connected to lever members by a pivot, wherein the jaw members extend over opposing surfaces defined by a portion of the drive track, and wherein the lever members are actuated to deploy the jaw members against the portion of the drive track.

In addition to one or more features of the system, or as an alternate, the parking brake includes a solenoid between the lever members, and the lever members are operationally connected to the solenoid, such that: in operation during deployment of the parking brake, the solenoid draws the lever members toward each other to thereby pivot the jaw members toward each other, and in operation during retraction of the parking brake, the solenoid biases the lever members away from each other to thereby pivot the jaw members away from each other.

In addition to one or more features of the system, or as an alternate, the jaw members and the drive track engage each other via a friction surface formed on one or both of the jaw members and the drive track.

In addition to one or more features of the system, or as an alternate, the parking brake includes: actuator blocks and brake blocks operationally engaged by the actuator blocks, wherein the brake blocks extend over opposing surfaces defined by a portion of the drive track and are moved against the portion of the drive track by the actuator blocks when the parking brake is deployed.

In addition to one or more features of the system, or as an alternate, each of the actuator blocks is wedge shaped and defines a base end and a top end, wherein in operation the base end is above the top end, and wherein the base end is wider than the top end; and each of the brake blocks is formed with a complementary shape to the respective one of the actuator blocks.

Further disclosed is a method of controlling movement of an elevator system, including: controlling a parking brake of a car mover and/or elevator car, wherein the parking brake is operationally separate from motor controlled wheels of the car mover, and wherein the motor controlled wheels are configured to move the car mover along a drive track in a hoistway so that the parking brake moves between a deployed state and a retracted state, wherein in the deployed state, the parking brake engages the drive track at a location that is spaced apart from the motor controlled wheels to park the car mover and/or elevator car along the hoistway, and in the retracted state, the parking brake is spaced apart from the drive track.

In addition to one or more features of the method, or as an alternate, the method includes controlling the parking brake automatically, under predetermined conditions, wherein a control command is transmitted from an elevator system controller.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 4 shows the parking brake in a deployed state and FIG. 5 shows the parking brake in a retracted state;

FIG. 6 shows the parking brake in a deployed state and FIG. 7 shows the parking brake in a retracted state;

FIG. 8 shows a top view of the system with the parking brake in the retracted state, FIG. 9 shows the parking brake in a retracted state and FIG. 10 shows the parking brake in a deployed state;

FIG. 11 shows a top view of the system with the parking brake in the retracted state, FIG. 12 shows the parking brake in a retracted state and FIG. 13 shows the parking brake in a deployed state;

FIG. 14 shows the parking brake in a retracted state and FIG. 15 shows the parking brake in a deployed state;

FIG. 16 shows the parking brake in a retracted state and FIG. 17 shows the parking brake in a deployed state;

FIG. 19 shows the parking brake in a retracted state and FIG. 20 shows the parking brake in a deployed state;

FIG. 21 shows the parking brake in a retracted state and FIG. 22 shows the parking brake in a deployed state;

FIG. 23 shows the parking brake in a retracted state and FIG. 24 shows the parking brake in a deployed state;

FIGS. 25-26 show an embodiment in which the parking brake includes a wedge shaped actuator and brakes, where FIG. 25 shows the parking brake in a retracted state and FIG. 26 shows the parking brake in a deployed state.

DETAILED DESCRIPTION

Figure 1:
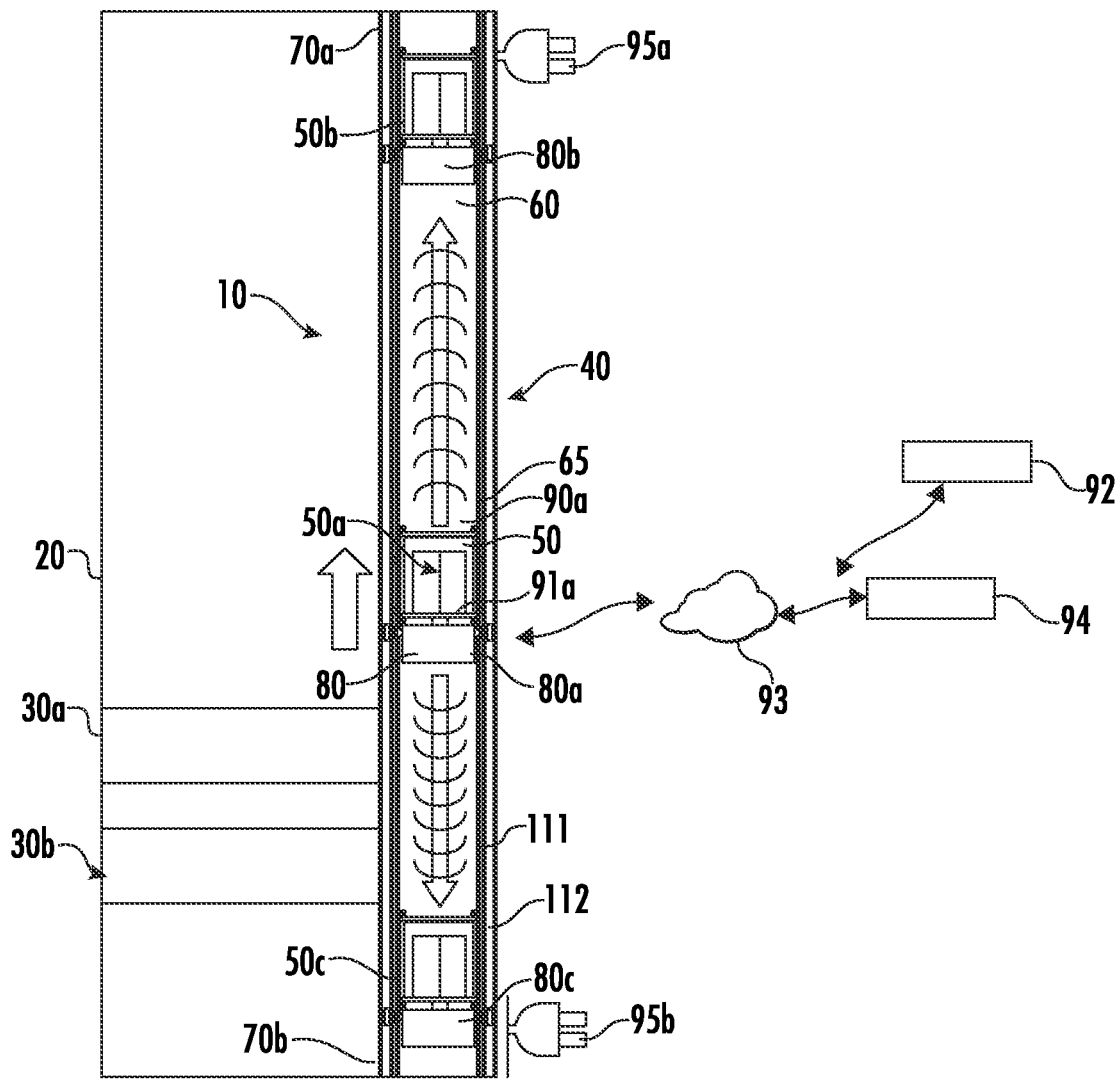
FIG. 1 is a schematic of elevator cars and car movers in a hoistway lane according to an embodiment.

FIG. 1 depicts a self-propelled or ropeless elevator system (elevator system) 10 in an exemplary embodiment that may be used in a structure or building 20 having multiple levels or floors 30a, 30b. Elevator system 10 includes a hoistway 40 (or elevator shaft) defined by boundaries carried by the building 20, and a plurality of cars 50a-50c adapted to travel in a hoistway lane 60 along an elevator car track 65 (which may be a T-rail) in any number of travel directions (e.g., up and down). The hoistway 40 may also include a top end terminus 70a and a bottom end terminus 70b.

For each of the cars 50a-50c, the elevator system 10 includes one of a plurality of car mover systems (car movers) 80a-80c (otherwise referred to as a beam climber system, or beam climber, for reasons explained below). The elevator car 50a and its car mover 80a may be generically referred to herein as an elevator car 50 and its car mover 80.

The car mover 80 is configured to move along a car mover track beam 111a (otherwise referred to as a track beam or guide beam, and which may be an I-beam), and specifically along a car mover track surface 112 (otherwise referred to as a track) of the track beam 111. This operation moves the elevator car 50 along the hoistway lane 60. The car mover 80 may be positioned to engage the top 90a of the car 50, the bottom 91a of the car 50, or any other desired location. In FIG. 1, the car mover 80 engages the bottom 91a of the car 50.

A supervisory hub 92 (also referred to as a supervisory controller) for the elevator system 10 may be included that may be configured with sufficient processors, discussed below, for communicating with a car mover controller 115 (FIG. 1, discussed below) of the car mover 80. The supervisory controller 92 may provide a certain level of supervisory instructions, communicate notifications, alerts, relay information bidirectionally, etc. The supervisory controller 92 may communicate using wireless or wired transmission paths as identified below. Transmission channels may be direct or via a network 93, and may include a cloud service 94, as further discussed below. Data may be transmitted in raw form or may be processed in whole or part at any one of the car mover controller 115, the supervisory controller 92 or the cloud service 94, and such data may be stitched together or transmitted as separate packets.

The hoistway may have charging stations 95a, 95b for charging a power supply 120 (FIG. 2, discussed below) on board the car mover 80. For example, one charging station 95a may be at a top end terminus 70a of the lane 60 of the hoistway 40 and another charging station 95b may be at a bottom end terminus 70b, or any other desired location. Some embodiments may include charging stations located intermediate of the top and bottom ends of the hoistway, such as at one or more intermediate levels/floors. In some embodiments, charging stations and transfer stations may be configured separately or together.

Figure 2:
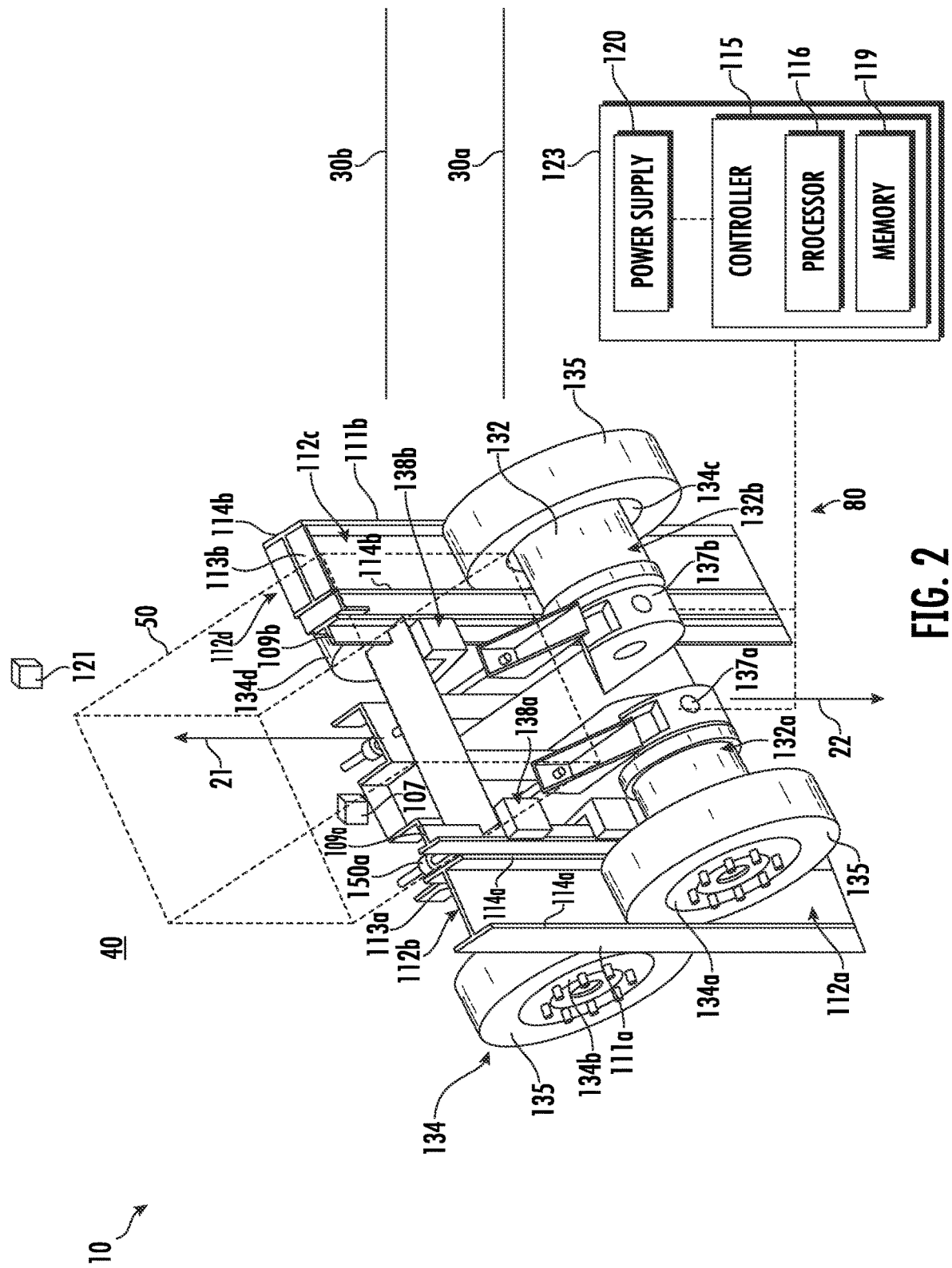
FIG. 2 shows a car mover according to an embodiment.

FIG. 2 is a perspective view of an elevator system 10 including the elevator car 50, a car mover 80, a controller 115, and a power source 120. Although illustrated in FIG. 1 as separate from the car mover 80, the embodiments described herein may be applicable to a controller 115 included in the car mover 80 (i.e., moving through an hoistway 40 with the car mover 80) as a combined control unit 123 with the power supply 121 and may also be applicable a controller located off of the car mover 80 (i.e., remotely connected to the car mover 80 and stationary relative to the car mover 80).

Although illustrated in FIG. 1 as separate from the car mover 80, the embodiments described herein may be applicable to a power source 120 included in the car mover 80 (i.e., moving through the hoistway 40 with the car mover 80) and may also be applicable to a power source located off of the car mover 80 (i.e., remotely connected to the car mover 80 and stationary relative to the car mover 80).

The car mover 80 is configured to move the elevator car 50 within the hoistway 40 and along guide rails 109a, 109b that extend vertically through the hoistway 40. In an embodiment, the guide rails 109a, 109b are T-beams. The car mover 80 includes one or more electric motors 132a, 132b (generally referred to as motors 132). The electric motors 132a, 132b are configured to move the car mover 80 within the hoistway 40 by rotating one or more motorized wheels 134a, 134b, 134c, 134d that are, in pairs (first pair 134a, 134b, and second pair 134c, 134d) pressed against respective guide beams 111a, 111b, e.g., together forming the car mover track beam 111 (FIG. 1). In an embodiment, the guide beams 111a, 111b are I-beams. It is understood that while an I-beam is illustrated any beam or similar structure may be utilized with the embodiment described herein. Friction between the wheels 134a, 134b, 134c, 134d driven by the electric motors 132a, 132b allows the wheels 134a, 134b, 134c, 134d climb up 21 and down 22 the guide beams 111a, 111b. The guide beam extends vertically through the hoistway 40. It is understood that while two guide beams 111a, 111b are illustrated, the embodiments disclosed herein may be utilized with one or more guide beams. It is also understood that while two electric motors 132a, 132b are illustrated, the embodiments disclosed herein may be applicable to a car mover 80 having one or more electric motors. For example, the car mover 80 may have one electric motor for each of the four wheels 134a, 134b, 134c, 134d (generically wheels 134). The electrical motors 132a, 132b may be permanent magnet electrical motors, asynchronous motor, or any electrical motor known to one of skill in the art. In other embodiments, not illustrated herein, another configuration could have the powered wheels at two different vertical locations (i.e., at bottom and top of an elevator car 50).

The first guide beam 111a includes a web portion 113a and two flange portions 114a. The web portion 113a of the first guide beam 111a includes a first surface 112a and a second surface 112b opposite the first surface 112a. A first wheel 134a is in contact with the first surface 112a and a second wheel 134b is in contact with the second surface 112b. The first wheel 134a may be in contact with the first surface 112a through a tire 135 and the second wheel 134b may be in contact with the second surface 112b through a tire 135. The first wheel 134a is compressed against the first surface 112a of the first guide beam 111a by a first compression mechanism 150a and the second wheel 134b is compressed against the second surface 112b of the first guide beam 111a by the first compression mechanism 150a. The first compression mechanism 150a compresses the first wheel 134a and the second wheel 134b together to clamp onto, or pinch against, the web portion 113a of the first guide beam 111a.

The first compression mechanism 150a may be a metallic or elastomeric spring mechanism, a pneumatic mechanism, a hydraulic mechanism, a turnbuckle mechanism, an electromechanical actuator mechanism, a spring system, a hydraulic cylinder, a motorized spring setup, or any other known force actuation method.

The first compression mechanism 150a may be adjustable in real-time during operation of the elevator system 10 to control compression of the first wheel 134a and the second wheel 134b on the first guide beam 111a. The first wheel 134a and the second wheel 134b may each include a tire 135 to increase traction with the first guide beam 111a.

The first surface 112a and the second surface 112b extend vertically through the hoistway 40, thus creating the track surface 112 for the first wheel 134a and the second wheel 134b to ride on. The flange portions 114a, which may be referred to as track beam sidewalls, may work as guardrails to help guide the wheels 134a, 134b along this track surface and thus help prevent the wheels 134a, 134b from running off track surface.

The first electric motor 132a is configured to rotate the first wheel 134a to climb up 21 or down 22 the first guide beam 111a. The first electric motor 132a may also include a first motor brake 137a to slow and stop rotation of the first electric motor 132a.

The first motor brake 137a may be mechanically connected to the first electric motor 132a. The first motor brake 137a may be a clutch system, a disc brake system, a drum brake system, a brake on a rotor of the first electric motor 132a, an electronic braking, an Eddy current brakes, a Magnetorheological fluid brake or any other known braking system. The beam climber system 130 may also include a first guide rail brake 138a operably connected to the first guide rail 109a. The first guide rail brake 138a is configured to slow movement of the beam climber system 130 by clamping onto the first guide rail 109a. The first guide rail brake 138a may be a caliper brake acting on the first guide rail 109a on the beam climber system 130, or caliper brakes acting on the first guide rail 109 proximate the elevator car 50.

The second guide beam 111b includes a web portion 113b and two flange portions 114b. The web portion 113b of the second guide beam 111b includes a first surface 112c and a second surface 112d opposite the first surface 112c. A third wheel 134c is in contact with the first surface 112c and a fourth wheel 134d is in contact with the second surface 112d. The third wheel 134c may be in contact with the first surface 112c through a tire 135 and the fourth wheel 134d may be in contact with the second surface 112d through a tire 135. A third wheel 134c is compressed against the first surface 112c of the second guide beam 111b by a second compression mechanism 150b and a fourth wheel 134d is compressed against the second surface 112d of the second guide beam 111b by the second compression mechanism 150b. The second compression mechanism 150b compresses the third wheel 134c and the fourth wheel 134d together to clamp onto the web portion 113b of the second guide beam 111b.

The second compression mechanism 150b may be a spring mechanism, turnbuckle mechanism, an actuator mechanism, a spring system, a hydraulic cylinder, and/or a motorized spring setup. The second compression mechanism 150b may be adjustable in real-time during operation of the elevator system 10 to control compression of the third wheel 134c and the fourth wheel 134d on the second guide beam 111b. The third wheel 134c and the fourth wheel 134d may each include a tire 135 to increase traction with the second guide beam 111b.

The first surface 112c and the second surface 112d extend vertically through the shaft 117, thus creating a track surface for the third wheel 134c and the fourth wheel 134d to ride on. The flange portions 114b may work as guardrails to help guide the wheels 134c, 134d along this track surface and thus help prevent the wheels 134c, 134d from running off track surface.

The second electric motor (otherwise referred to as a wheel drive motor or wheel motor) 132b is configured to rotate the third wheel 134c to climb up 21 or down 22 the second guide beam 111b. The second electric motor 132b may also include a second motor brake 137b to slow and stop rotation of the second motor 132b. The second motor brake 137b may be mechanically connected to the second motor 132b. The second motor brake 137b may be a clutch system, a disc brake system, drum brake system, a brake on a rotor of the second electric motor 132b, an electronic braking, an Eddy current brake, a Magnetorheological fluid brake, or any other known braking system. The beam climber system 130 includes a second guide rail brake 138b operably connected to the second guide rail 109b. The second guide rail brake 138b is configured to slow movement of the beam climber system 130 by clamping onto the second guide rail 109b. The second guide rail brake 138b may be a caliper brake acting on the first guide rail 109a on the beam climber system 130, or caliper brakes acting on the first guide rail 109a proximate the elevator car 50.

The elevator system 10 may also include a position reference system (PRS) 113. The position reference system 121 (otherwise referred to as a sensor) may be mounted on a fixed part at the top of the hoistway 40, such as on a support or guide rail 109, and may be configured to provide position signals related to a position of the elevator car 50 within the hoistway 40. In other embodiments, the position reference system 121 may be directly mounted to a moving component of the elevator system (e.g., the elevator car 50 or the car mover 80), or may be located in other positions and/or configurations.

The position reference system 121 can be any device or mechanism for monitoring a position of an elevator car within the elevator shaft 117. For example, without limitation, the position reference system 121 can be an encoder, sensor, accelerometer, altimeter, pressure sensor, range finder, or other system and can include velocity sensing, absolute position sensing, etc., as will be appreciated by those of skill in the art. The position reference system 121 may communicate with the car mover controller 115 wirelessly or via a wired transmission, using protocols identified herein. Wireless transmission may be direct or via network 93 (FIG. 1) and may include transmissions through a cloud service 94 (FIG. 1). Data from the position reference system 121 may be sent in raw form or may be compiled in whole or part at any one of the position reference system 121, via edge computing, or at the car mover controller 115 or cloud service 94, and portions of the data in any such form may be stitched together or transmitted as separate packets of information.

The controller 115 may be an electronic controller including a processor 116 and an associated memory 119 comprising computer-executable instructions that, when executed by the processor 116, cause the processor 116 to perform various operations. The processor 116 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 119 may be but is not limited to a random access memory (RAM), read only memory (ROM), or other electronic, optical, magnetic or any other computer readable medium.

The controller 115 is configured to control the operation of the elevator car 50 and the car mover 80. For example, the controller 115 may provide drive signals to the car mover 80 to control the acceleration, deceleration, leveling, stopping, etc. of the elevator car 50.

The controller 115 may also be configured to receive position signals from the position reference system 121 or any other desired position reference device. The data transmitted between the controller 115 and position reference system 121 may be obtained and processed separately and stitched together, or processed at one of the two components, and may be processed in a raw or complied form.

When moving up 21 or down 22 within the hoistway 40 along the guide rails 109a, 109b, the elevator car 50 may stop at one or more floors 30a, 30b as controlled by the controller 115. In one embodiment, the controller 115 may be located remotely or in the cloud. In another embodiment, the controller 115 may be located on the car mover 80.

The power supply 120 for the elevator system 10 may be any power source, including a power grid and/or battery power which, in combination with other components, is supplied to the car mover 80. In one embodiment, power source 120 may be located on the car mover 80. In an embodiment, the power supply 120 is a battery that is included in the car mover 80. The elevator system 10 may also include an accelerometer 107 attached to the elevator car 50 or the car mover 80. The accelerometer 107 is configured to detect an acceleration and/or a speed of the elevator car 50 and the car mover 80.

The above disclosed car mover 80 utilizes motor-driven wheels 134 to propel the elevator car 50 up and down on a vertical I-beam track 111. The wheels 134 will be pinched together to produce relatively large normal force, e.g., by motors 132, to produce the needed traction to support the required vertical propulsive forces. An issue with this system may include that when the car mover 80 is parked, these loads may produce flat spots which may create ride quality issues. In addition, such loading may reduce the effective life of each tire 135.

Figure 3:
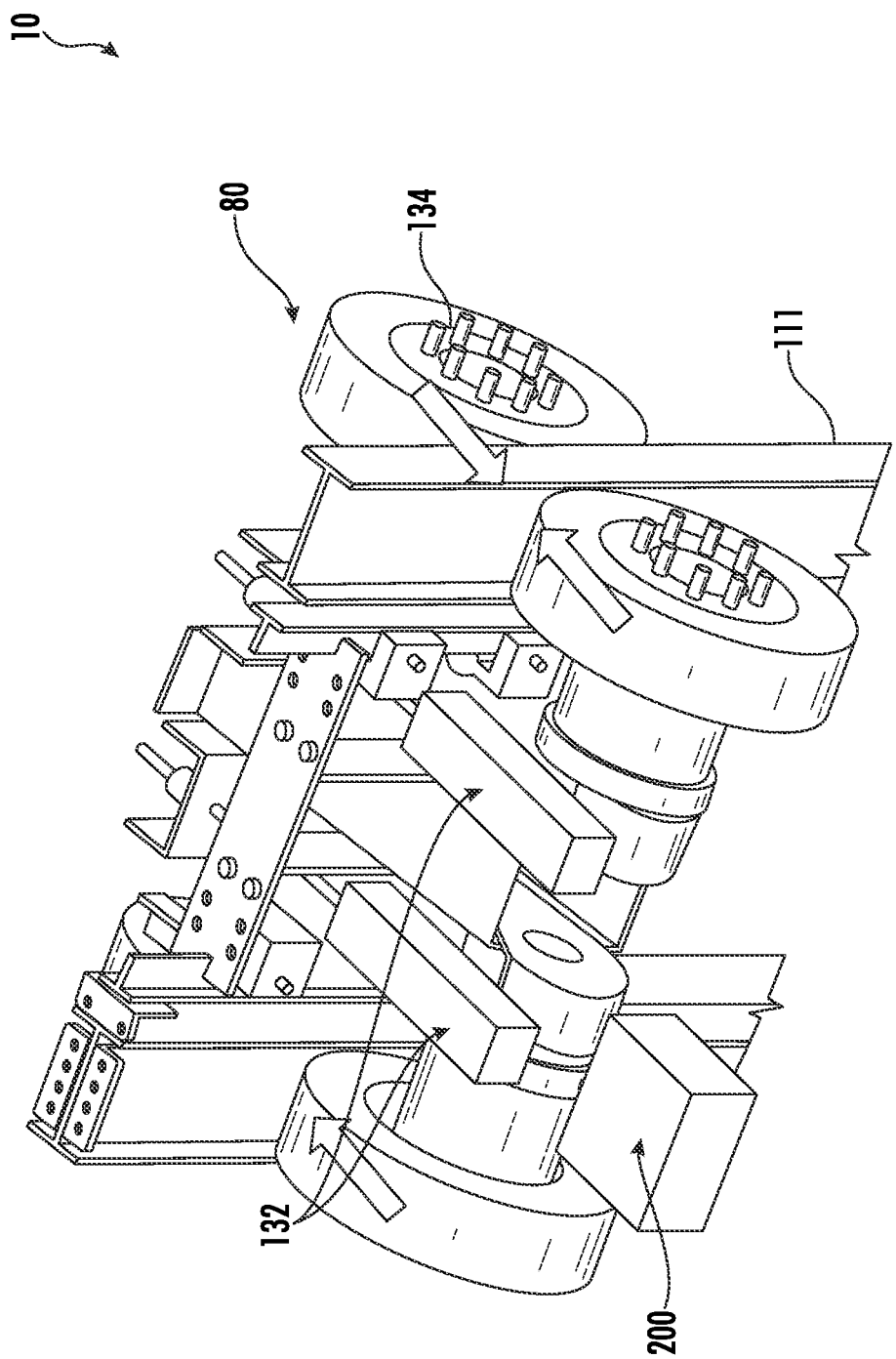
FIG. 3 shows the car mover with a parking brake.

As shown in FIG. 3, the elevator system 10 includes, as indicated, the car mover 80 for moving the elevator car 50 (FIG. 1) along the drive track 111 in the hoistway 40. The car mover 80 includes the motor controlled wheels 134. The car mover 80 is configured to control the motor controlled wheels 134 to move along the drive track 111. A parking brake 200 (or vehicle locking device) is operationally connected to the car mover 80 and/or elevator car 50 and operationally separate from the motor controlled wheels 134. The car mover 80 and/or elevator car 50 is configured to control the parking brake 200, e.g. via the control unit 123 (FIG. 2) to move between a deployed state (shown schematically in FIG. 3) and a retracted state (discussed in greater detail below). In the deployed state, the parking brake 200 engages the drive track 111 at a location that is spaced apart from the motor controlled wheels 134 to park the car mover 80 and/or elevator car 50 along the hoistway 40. In the retracted state, the parking brake 200 is spaced apart from drive track 111.

Figure 5:
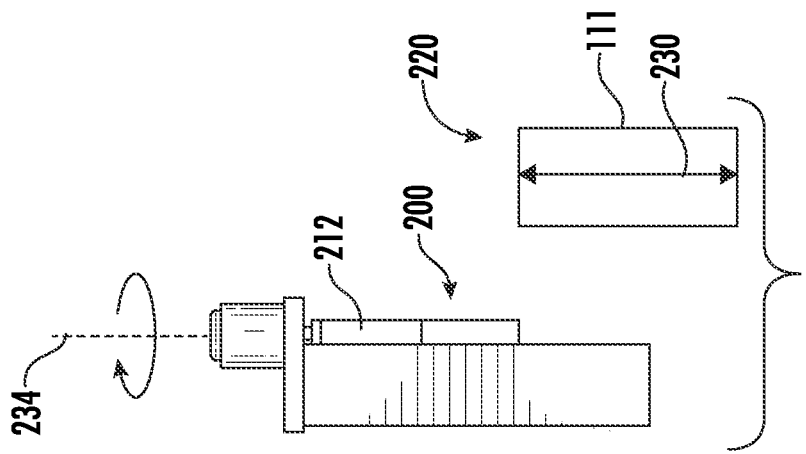
FIGS. 4-5 show an embodiment in which the parking brake includes a swing arm that pivots about a vertical axis, where
Figure 4:
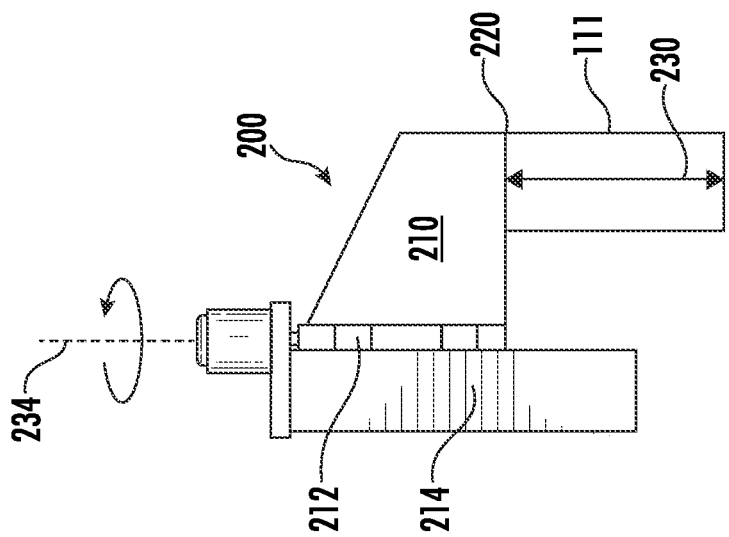

As shown in FIGS. 4-5, the parking brake 200 may include a swing arm 210 in the form of a trapezoidal plate that is configured to pivot between the retracted stated and the deployed state about a hinge 212. The hinge 212 may be motorized and connected to a post 214 that extends from the car mover 80 and/or elevator car 50 (FIG. 3). In the deployed state (FIG. 4), the swing arm 210 engages an aperture 220 in the drive track 111 to park the car mover 80 and/or elevator car 50 along the hoistway 40. The aperture 220 may be formed in one of the flanges 114 (FIG. 2), though such location is not intended on limiting the location of the aperture 220. The swing arm 210 may be configured to pivot about an axis 234 (vertical axis) that is parallel to a long axis 230 of the drive track 111.

Alternatively, the swing arm 210 is operationally connected to the hoistway 40 and the car mover 80 and/or elevator car 50 includes a supporting feature, which may be a beam connected to a frame of the car mover 80 and/or elevator car 50, similar to a jack point on an automobile, that engages the swing arm 210 when deployed. It is to be appreciated that in all embodiments disclosed herein, in which certain aspects are operationally connected to the car mover 80 and/or elevator car 50 and other aspects are operationally connected to the hoistway 40, such aspects may be positionally and operationally swapped with each other. Such modifications are considered within the scope of the disclosure.

Figure 7:
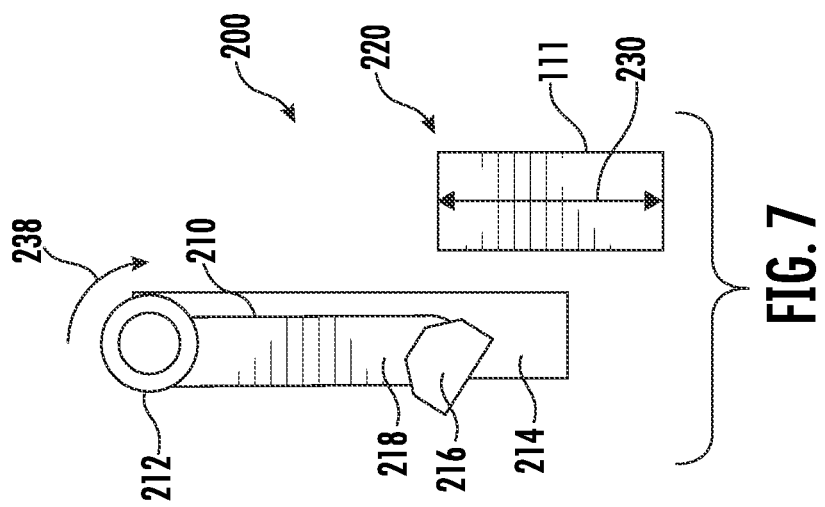
FIGS. 6-7 show an embodiment in which the parking brake includes a swing arm that pivots about a horizontal axis, where
Figure 6:
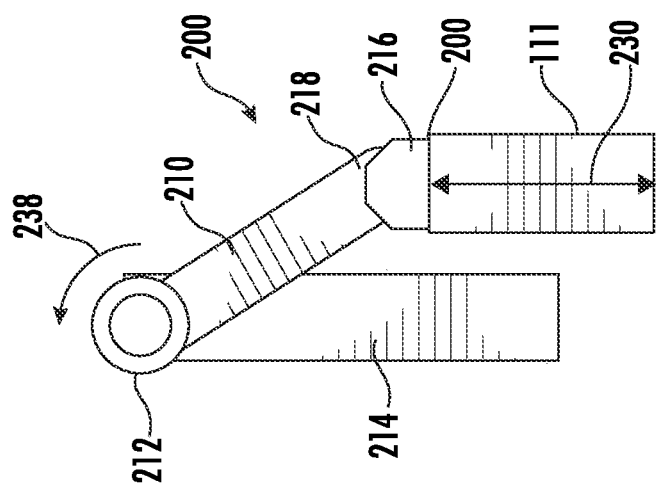

As shown in FIGS. 6-7, the parking brake 200 may include a swing arm 210 in the form of a link arm that is configured to pivot between the retracted stated and the deployed state about a hinge 212. The hinge 212 may be motorized and connected to a post 214 that extends from the car mover 80 (FIG. 3) and/or elevator car 50. In the deployed state (FIG. 6), the swing arm 210 engages an aperture 220 in the drive track 111 via a foot 216 at a free end 218 of the link arm to park the car mover 80 and/or elevator car 50 along the hoistway 40. The aperture 220 may be formed in one of the flanges 114 (FIG. 2), though such location is not intended on limiting the location of the aperture 220. The swing arm 210 may be configured to pivot about an axis 238 (horizontal axis) that is perpendicular to a long axis 230 of the drive track 111.

Figure 10:
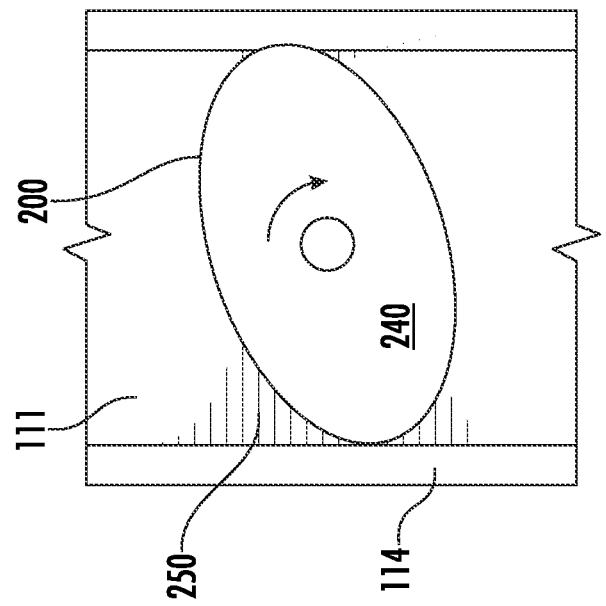
FIGS. 8-10 show an embodiment in which the parking brake includes a single cam system, where
Figure 9:
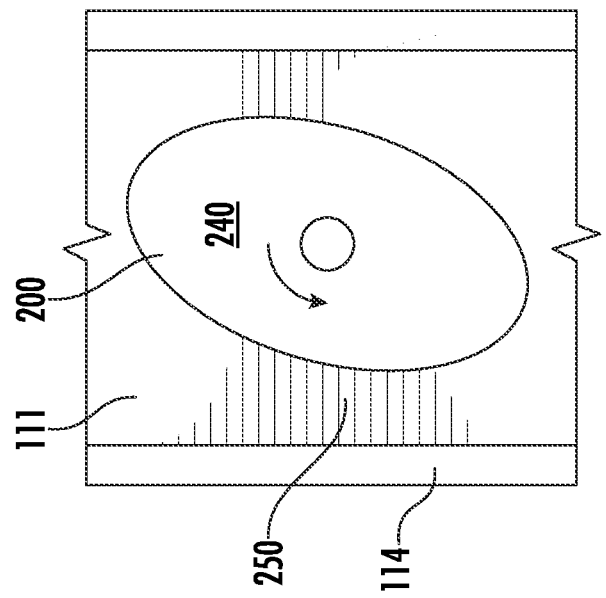
Figure 8:
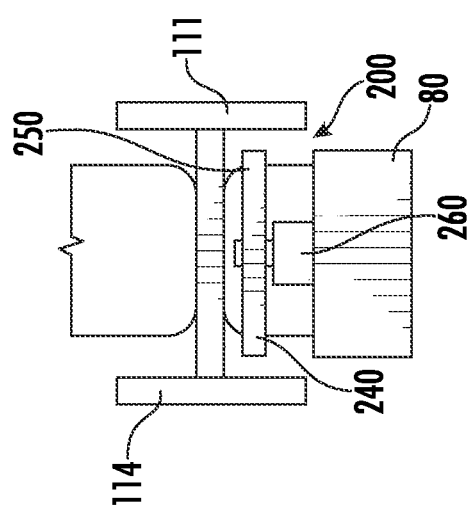

As shown in FIGS. 8-10, the parking brake 200 may include an arcuate plate member 240 configured to pivot so that an outer surface 250 of the arcuate plate member 240 engages opposing flanges 114 of the drive track 111 when deployed (FIG. 10). When retracted, the outer surface 250 of the arcuate plate member 240 is spaced apart from the opposing flanges 114 (FIGS. 8, 9). The arcuate plate member 240 may form an ellipse. The arcuate plate member 240 may be operationally connected to the car mover 80 and/or elevator car 50 via a rotational shaft 260 connected to a center of it. This configuration forms a single cam parking brake.

Figure 13:
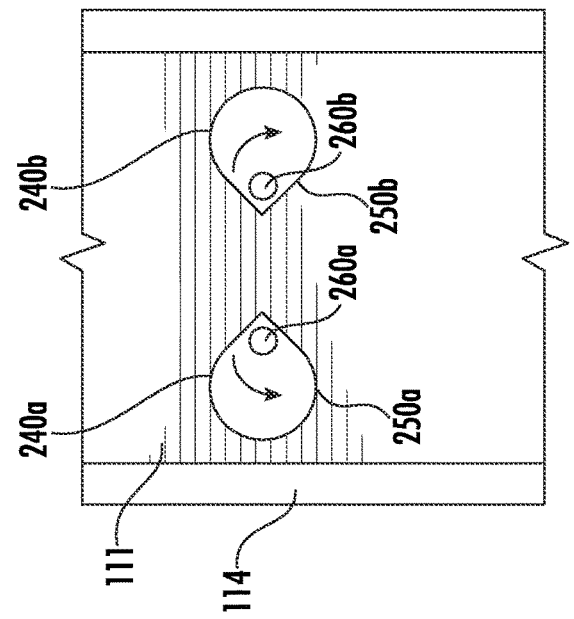
FIGS. 11-13 show an embodiment in which the parking brake includes dual cam system, where
Figure 12:
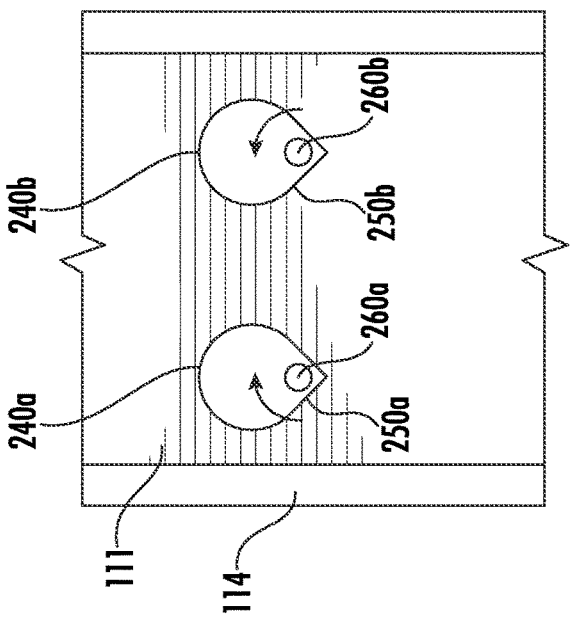
Figure 11:
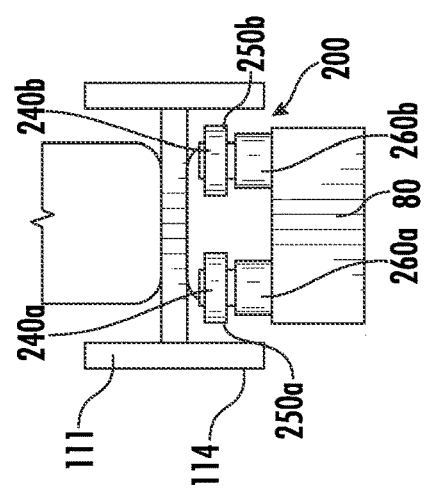

As shown in FIGS. 11-13, the parking brake 200 may include a pair of arcuate plate members 240a, 240b that are configured to pivot so that an outer surface 250a, 250b of each of the arcuate plate members 240a, 240b respectively engages ones of opposing flanges 114 of the drive track 111 (FIG. 13). The arcuate plate members 240 are teardrop shaped. The arcuate plate members 240 are operationally connected to the car mover 80 and/or elevator car 50 via respective rotational shafts 260a, 260b. The rotational shafts 260a, 260b connected off center to the arcuate plate members 240a, 240b to enable a skewed rotation that enables engagement with the flanges 114 when deployed and non-engagement (FIGS. 11, 12) when retracted. This configuration forms a dual cam parking brake.

Figure 15:
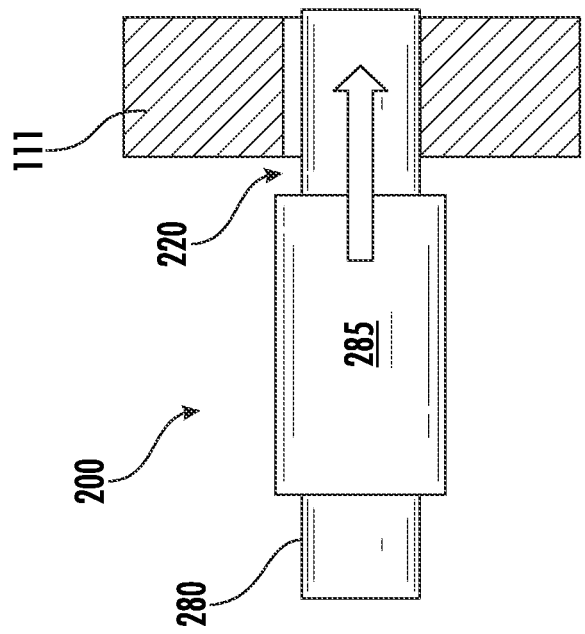
FIGS. 14-15 show an embodiment in which the parking brake includes a plunger, where
Figure 14:
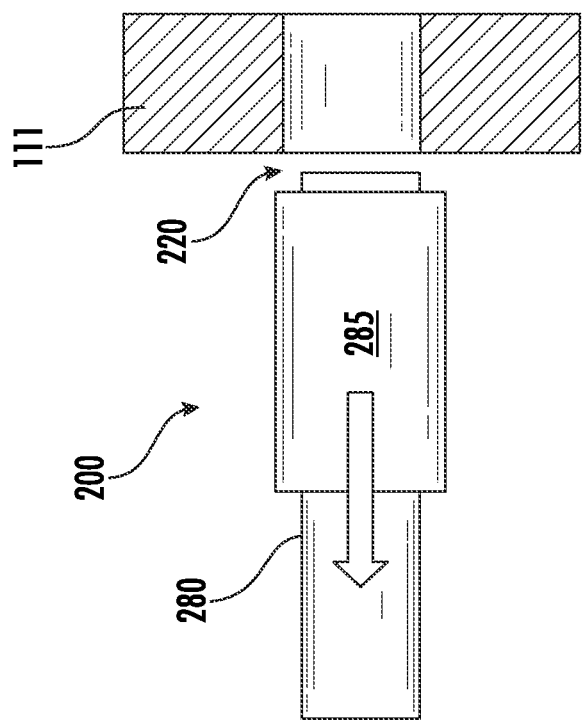

As shown in FIGS. 14-15, the parking brake 200 includes a plunger 280 that is configured to linearly transition via a collar 285 fixed to the car mover 80 and/or elevator car 50 between the deployed state (FIG. 15) and the retracted state (FIG. 14). In the deployed state the plunger 280 engages the aperture 220 in the drive track 111 to park the car mover 80 and/or elevator car 50 (FIG. 3) along the hoistway 40 (FIG. 3). This configuration forms a peg-in-hole parking brake.

Figure 17:
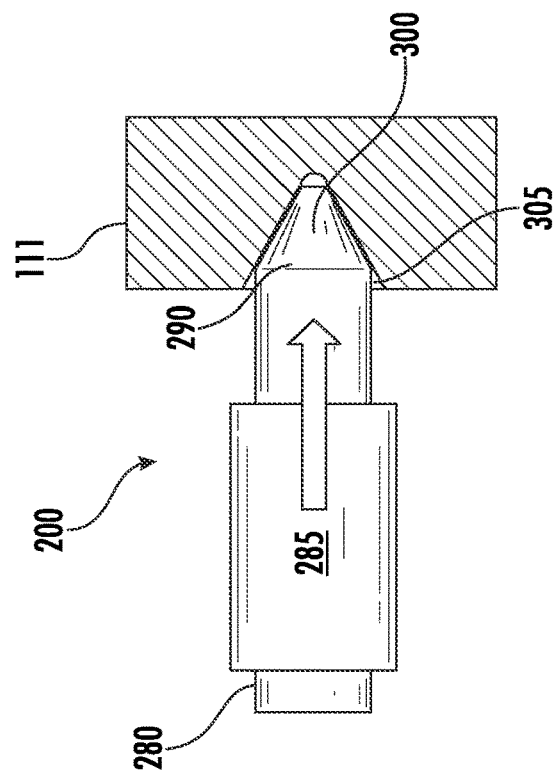
FIGS. 16-17 show an embodiment in which the parking brake includes a cone-shaped plunger, where
Figure 16:
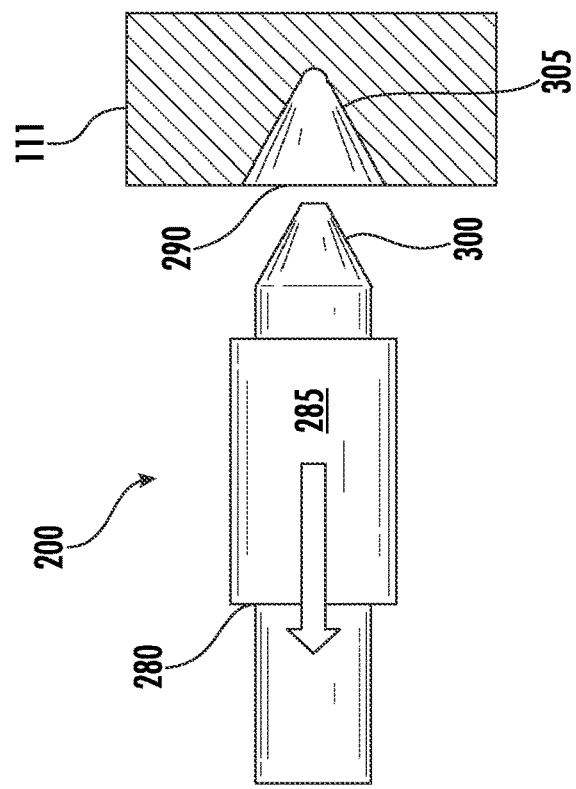
Figure 18A:
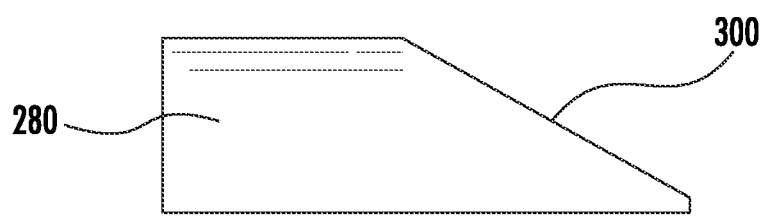
FIGS. 18A-18B show embodiments in which the parking brake includes a wedge-shaped plunger.
Figure 18B:
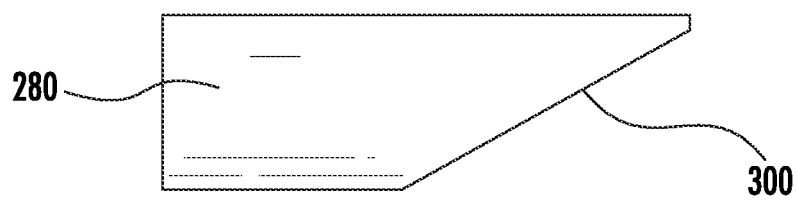

As shown in FIGS. 16-17, the parking brake 200 includes another plunger 280 that is configured to linearly transition via a collar 285 fixed to the car mover 80 and/or elevator car 50 between the deployed state and the retracted state. In the deployed state the plunger 280 engages a groove 290 in the drive track 111 to park the car mover 80 (FIG. 3) and/or elevator car 50 along the hoistway 40 (FIG. 3). A drive track engaging end 300 of the plunger 280 is conically shaped or wedge shaped with a vertically lower end tip or vertically upper end-tip (FIGS. 18A, 18B respectively). The groove 305 (FIG. 16) in the drive track 111 defines a complementary shape to the drive track engaging end 300 of the plunger 280.

Figure 20:
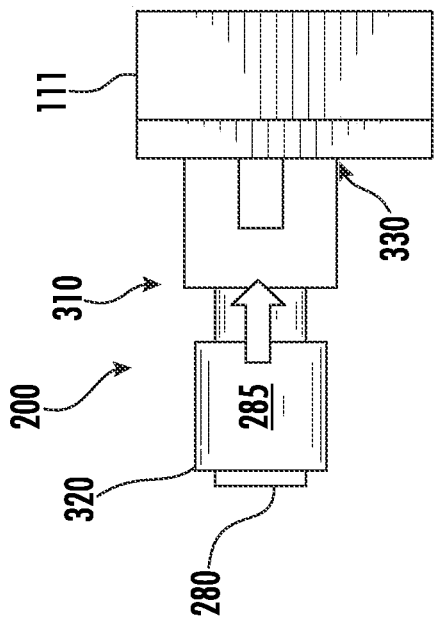
FIGS. 19-20 show an embodiment in which the parking brake includes a permanent magnet, where
Figure 19:
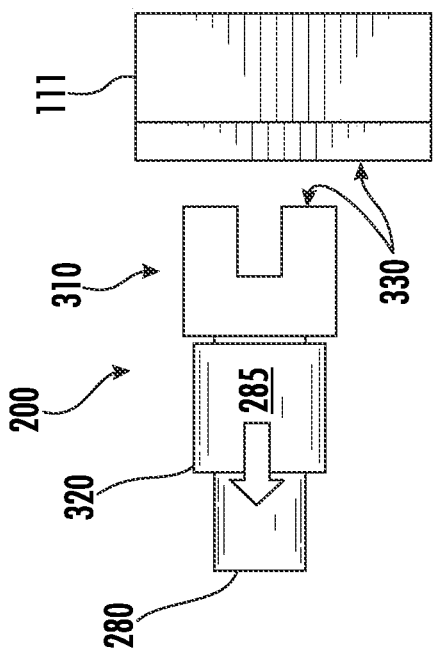

As shown in FIGS. 19-20, the parking brake 200 may include a permanent magnet 310 connected to a plunger 280 configured to translate linearly via a collar 285 fixed to the car mover 80 and/or elevator car 50 to engage the drive track 111 to park the car mover 80 (FIG. 3) and/or elevator car 50 along the hoistway 40 (FIG. 3). The parking brake 200 may include a solenoid 320 that operationally controls the solenoid 320. During deployment of the parking brake 200, operation of the solenoid 320 linearly translates the permanent magnet 310 to engage the drive track 111 (FIG. 20). During retraction of the parking brake, operation of the solenoid 320 linearly translates the permanent magnet 310 away from the drive track 111 (FIG. 19). The permanent magnet 310 and the drive track 111 may engage each other via a friction surface 330 formed on one or both of the permanent magnet 310 and the drive track 111.

Figure 22:
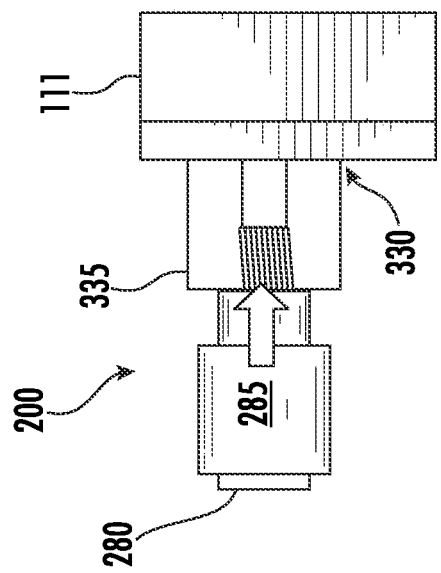
FIGS. 21-22 show an embodiment in which the parking brake includes an electromagnet, where
Figure 21:
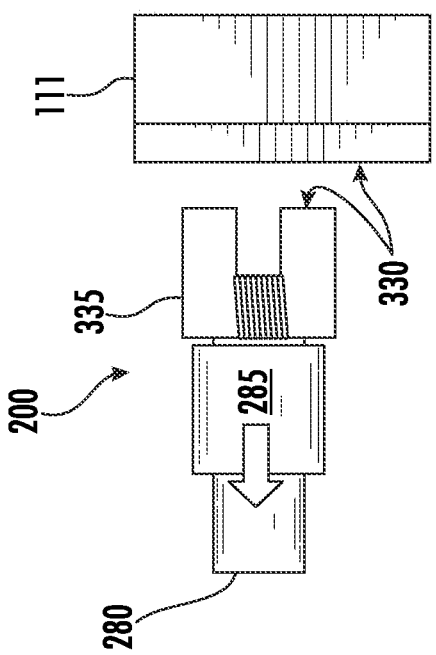

As shown in FIGS. 21-22, the parking brake 200 may include an electromagnet 335 to a plunger 280 configured to translate linearly via a collar 285 fixed to the car mover 80 and/or elevator car 50 to engage the drive track 111 to park the car mover 80 (FIG. 3) and/or elevator car 50 along the hoistway 40 (FIG. 3). During a controllable deployment of the parking brake 200, operation of the electromagnet 335 linearly translates the electromagnet 335 to engage the drive track 111 (FIG. 22). During retraction of the parking brake, operation of the electromagnet 335 linearly translates the electromagnet 335 away from the drive track 111 (FIG. 21). The electromagnet 335 and the drive track 111 may engage each other via a friction surface 330 formed on one or both of the permanent magnet 310 and the drive track 111.

Figure 23:
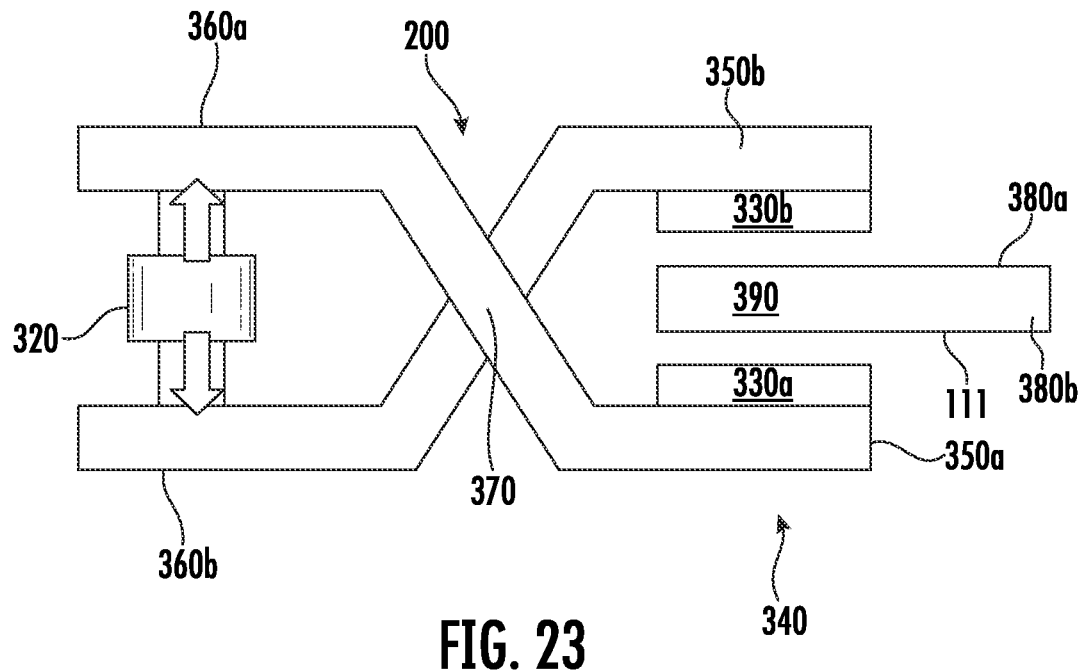
FIGS. 23-24 show an embodiment in which the parking brake includes a caliper mechanism, where
Figure 24:
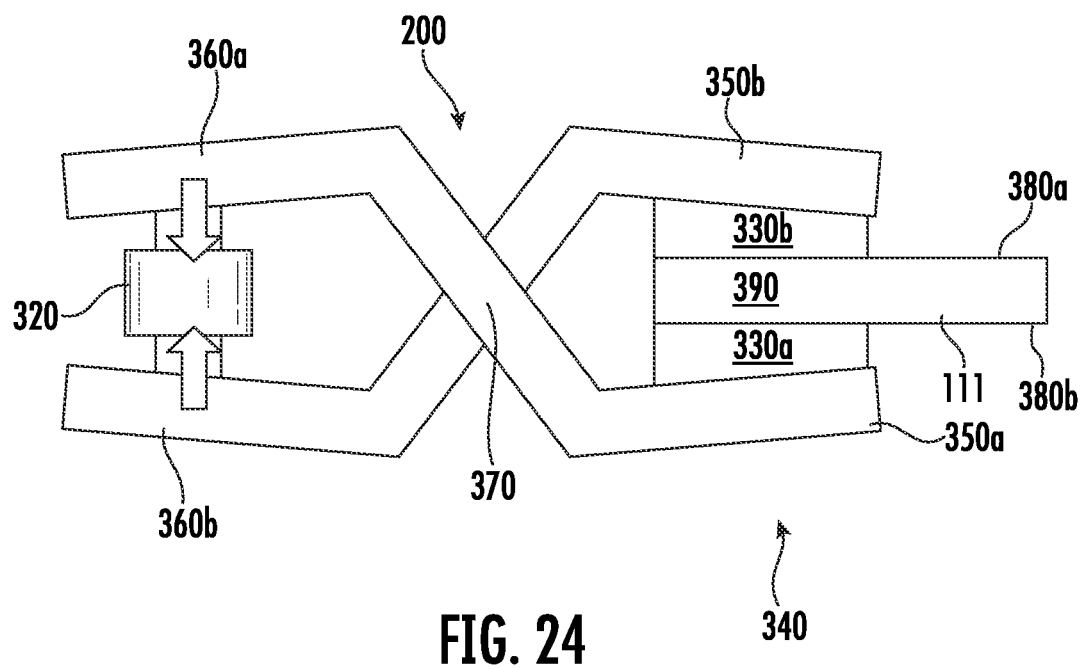

As shown in FIGS. 23-24, the parking brake 200 may include a scissor brake 340 defining jaw members 350a, 350b respectively connected to, e.g., so as to be continuous with, lever members 360a, 360b by a pivot 370. The jaw members 350 extend over opposing surfaces 380a, 380b defined by a portion 390 of the drive track 111. The lever members 360 are actuated to deploy the jaw members 350 against the portion 390 of the drive track 111.

The parking brake 200 may include a solenoid 395 between the lever members 360a, 360b. The lever members 360a, 360b are operationally connected to a solenoid 320. In other embodiments, lever members 360a, 360b are actuated via, e.g., a linear actuator, a motor, hydraulics, pneumatics, electromagnets, as nonlimiting examples. From this configuration, during deployment of the parking brake 200

(FIG. 24), operation of the solenoid 320 draws the lever members 360 toward each other. This action pivots the jaw members 350 toward each other and against the drive track 111. During retraction of the parking brake 200 (FIG. 23), operation of the solenoid 320 biases the lever members 360 away from each other. This action pivots the jaw members 350 away from each other. The jaw members 350 and the drive track 111 may engage each other via a friction surfaces 330a, 330b formed or deposited on one or both of the jaw members 350a, 350b and the drive track 111. Thus, the parking brake 200 is formed as a caliper mechanism.

As shown in FIG. 25-26, the parking brake 200 includes actuator blocks 400a, 400b and brake blocks 410a, 410b operationally engaged by the actuator blocks 400a, 400b. The brake blocks 410a, 410b extend over opposing surfaces 380a, 380b defined by a portion 390 of the drive track 111 and are moved against the portion 390 of the drive track 111 by the actuator blocks 400 when the parking brake 200 is deployed (FIG. 26). Movement of the actuator blocks 400a, 400b may be controlled by, or formed as, a solenoid, a linear motor, an electromagnet, or pneumatic or hydraulic actuation, where additional components, such as a solenoid, are shown schematically as 393.

Each of the actuator blocks 400a, 400b is wedge, or trapezoidal, shaped and defines a base end 420 and a top end 430. The base end 420 is wider than the top end 430. A drive track facing surface 432 of the actuator blocks 400a, 400b is angled relative to a long axis 230 of the drive track 111 and an opposing surface of the actuator blocks 434 is parallel to the long axis of the drive drack 111. In operation the base end 420 is above the top end 430. Each of the brake blocks 410a, 410b is formed with a shape that is complementary to the respective actuator blocks 400a, 400b. As a result, the brake blocks 410a, 410b are also formed in a wedge shape. For example, the brake block 410a, 410b is shaped as a trapezoid, with a drive track facing surface 440 that is parallel to the axis 230 of the drive track 111 and a top end 442 of the brake block 410 is wider than the bottom end 444.

Figure 27:
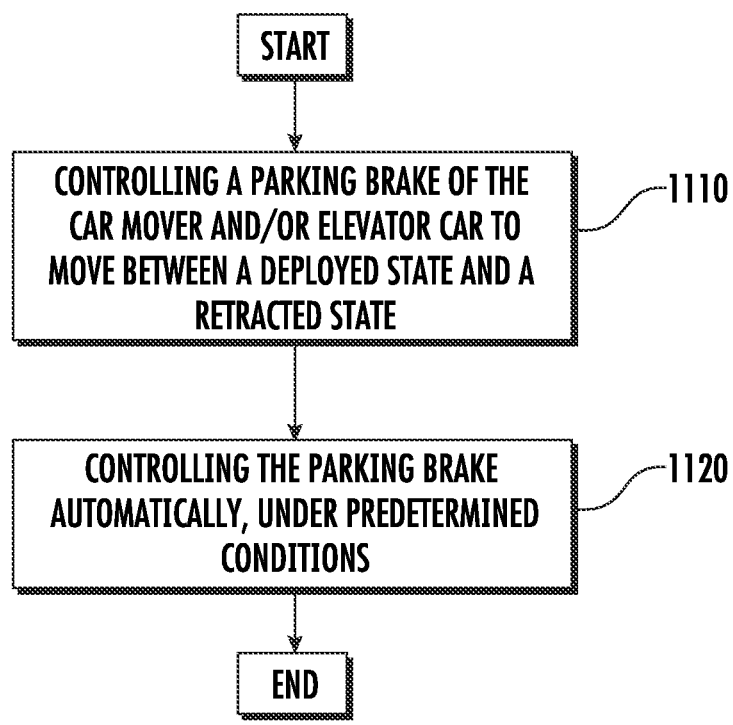
FIG. 27 is a flow chart showing an operation of a car mover that utilizes the parking brake according to an embodiment.

Turning to FIG. 27, a flowchart shows a method of controlling movement of an elevator system 10. As shown in block 1110, the method includes controlling (e.g., applying) a parking brake 200 by the car mover 80 and/or elevator car 50, to move between a deployed state and a retracted state. In the deployed state, the parking brake 200 engages the drive track 111 at a location that is spaced apart from the motor controlled wheels 134 to park the car mover 80 along the hoistway 40. In the retracted state, the parking brake 200 is spaced apart from drive track 111. As shown in block 1120, the method includes controlling the parking brake 200 automatically (i.e., without human intervention) when the systems decides its appropriate, e.g. under predetermined conditions. Such decision may be provided via a control communication that may be transmitted from an overall elevator system controller, in some embodiments. In one embodiment, such decision could also be made locally by the elevator car 50 and/or car mover 80 under certain scenarios. Such scenarios may include the elevator car 50 and/or car mover 80 is to remain stationary at a landing, e.g., to discharge and/or receive passengers, and/or when there are no current car calls to the elevator car 50 and/or mover 80, and/or when the elevator car 50 and/or car mover 80 is to remain stationary for a predetermined amount of time, e.g. 30 seconds, or any desired longer/shorter time. Such conditions may be a determination that the car mover 80 and/or elevator car 50 may remain in one location in the hoistway for an extended period of time. As indicated, the parking brake 200 is operationally separate from motor controlled wheels 134 of the car mover 80. The motor controlled wheels 134 are configured to move the car mover 80 along the drive track 111 in the hoistway 40 by operation of the car mover 80.

Thus, as disclosed above, the embodiments relate to an external vehicle locking device (parking brake 200) that will be engaged when the car mover 80 is parked at a location and will be there for a duration that warrants releasing the tire forces to avoid flat spotting the tires 135. The parking brake 200 could be positive engagement mechanisms, such as a peg in hole, or a swing arm locking device. Each of these devices would be controlled and monitored to ensure they are properly engaged before the normal force control devices on the car mover 80 would be commanded to release the normal force on the tires 135. Thus, the embodiments provide an auxiliary vehicle support for force release control, e.g., when normal forces from the tires are released. The car mover 80 would be brought back into service by reversing the process in that demand would be confirmed, the car mover 80 normal force control devices would be engaged and confirmed, and then the parking brake 200 would be retracted.

Benefits of the disclosed embodiments include addressing needs for the car mover 80 including ride quality, energy efficiency and tire life. Removing high force loading on the wheels 134 when parked may reduce the potential for flat spotting the solid tires 135 which would create potentially unacceptable in-cab vibrations. The embodiments also eliminate a need to cycle the car mover vehicle during non-demand periods which is energy inefficient. Lastly, the concentrated loads and flat spots on the wheels 134 without the disclosed embodiments may reduce the effective tire life.

Wireless connections identified above may apply protocols that include local area network (LAN, or WLAN for wireless LAN) protocols and/or a private area network (PAN) protocols. LAN protocols include WiFi technology, based on the Section 802.11 standards from the Institute of Electrical and Electronics Engineers (IEEE). PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. Such wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). The above is not intended on limiting the scope of applicable wireless technologies.

Wired connections identified above may include connections (cables/interfaces) under RS (recommended standard)—422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

As indicated, when data is transmitted over a network between end processors, the data may be transmitted in raw form or may be processed in whole or part at any one of the end processors or an intermediate processor, e.g., at a cloud service or other processor. The data may be parsed at any one of the processors, partially or completely processed or complied, and may then be stitched together or maintained as separate packets of information.

Each processor identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium. Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system, comprising:
a car mover for moving an elevator car along a drive track in a hoistway, the car mover comprising:
motor controlled wheels, wherein the car mover is configured to control the motor controlled wheels to move along the drive track; and
a parking brake, operationally connected to the car mover and/or the elevator car and operationally separate from the motor controlled wheels, wherein the car mover is configured to control the parking brake to move between a deployed state and a retracted state,
wherein:
in the deployed state, the parking brake engages the drive track at a location that is spaced apart from the motor controlled wheels to park the car mover and/or the elevator car along the hoistway;
in the retracted state, the parking brake is spaced apart from the drive track;

the parking brake includes a swing arm, the swing arm is configured to pivot between the retracted state and the deployed state, wherein in the deployed state, the swing arm engages an aperture in the drive track to park the car mover and/or the elevator car along the hoistway; and the swing arm is configured to pivot about an axis that is parallel or perpendicular to a long axis of the drive track.

2. A method of controlling movement of an elevator system, comprising:
controlling a parking brake of a car mover and/or an elevator car,
wherein the parking brake is operationally separate from motor controlled wheels of the car mover, and
wherein the motor controlled wheels are configured to move the car mover along a drive track in a hoistway so that the parking brake moves between a deployed state and a retracted state,
wherein:
in the deployed state, the parking brake engages the drive track at a location that is spaced apart from the motor controlled wheels to park the car mover and/or the elevator car along the hoistway, and
in the retracted state, the parking brake is spaced apart from the drive track
the parking brake includes a swing arm, the swing arm is configured to pivot between the retracted state and the deployed state, wherein in the deployed state, the swing arm engages an aperture in the drive track to park the car mover and/or the elevator car along the hoistway; and
the swing arm is configured to pivot about an axis that is parallel or perpendicular to a long axis of the drive track.

3. The method of claim 2, comprising:
controlling the parking brake automatically, under predetermined conditions, wherein a control command is transmitted from an elevator system controller.

* * * * *